United States Patent
Tanabe et al.

(10) Patent No.: US 10,228,244 B2
(45) Date of Patent: Mar. 12, 2019

(54) MOBILE ELECTRONIC DEVICE, CONTROLLING METHOD, AND CONTROL PROGRAM FOR COMPUTER

(71) Applicant: KYOCERA Corporation, Kyoto-shi, Kyoto (JP)

(72) Inventors: Shigeki Tanabe, Yokohama (JP); Hideki Morita, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 256 days.

(21) Appl. No.: 15/105,614

(22) PCT Filed: Dec. 18, 2014

(86) PCT No.: PCT/JP2014/083605
§ 371 (c)(1),
(2) Date: Jun. 17, 2016

(87) PCT Pub. No.: WO2015/098706
PCT Pub. Date: Jul. 2, 2015

(65) Prior Publication Data
US 2016/0320186 A1     Nov. 3, 2016

(30) Foreign Application Priority Data
Dec. 24, 2013  (JP) ................... 2013-265689

(51) Int. Cl.
*G01L 27/00* (2006.01)
*G01C 5/06* (2006.01)
(Continued)

(52) U.S. Cl.
CPC ............. *G01C 5/06* (2013.01); *H04W 4/027* (2013.01); *H04M 1/72522* (2013.01); *H04M 2250/12* (2013.01)

(58) Field of Classification Search
CPC ..... G01C 5/06; G01C 5/005; H04M 1/72522; H04M 2250/12; G01L 27/00; G01L 27/002; G01L 27/005
(Continued)

(56) References Cited

U.S. PATENT DOCUMENTS

2003/0136191 A1* 7/2003 Tsuji ..................... G01C 5/06
                                                      73/384
2016/0306051 A1* 10/2016 Hirabayashi ........... G01C 21/20

FOREIGN PATENT DOCUMENTS

CN    203524681    *  4/2014
EP    0996004 A2     4/2000
(Continued)

OTHER PUBLICATIONS

International Search Report dated Mar. 24, 2015, in International Application No. PCT/JP2014/083605.

*Primary Examiner* — Robert R Raevis
(74) *Attorney, Agent, or Firm* — Hauptman Ham, LLP

(57) ABSTRACT

A mobile electronic device (e.g., a smartphone) includes an atmospheric pressure sensor, an acceleration sensor, and a controller. The atmospheric pressure sensor detects atmospheric pressure acting on the mobile electronic device. The acceleration sensor detects acceleration acting on the mobile electronic device. The controller detects traveling of the device on the basis of the acceleration. The controller calculates a change in an altitude of the device by correcting a change in the atmospheric pressure observed while the device is traveling, on the basis of a change in the atmospheric pressure observed while the device is not traveling.

8 Claims, 9 Drawing Sheets

(51) Int. Cl.
*H04W 4/02* (2018.01)
*H04M 1/725* (2006.01)

(58) Field of Classification Search
USPC ... 73/1.59, 1.62–1.64, 178 R, 179, 384–387, 73/865.2; 701/85, 87, 94, 97, 98, 104; 342/120–122
See application file for complete search history.

(56) References Cited

FOREIGN PATENT DOCUMENTS

| | | | |
|---|---|---|---|
| GB | 2252405 | * | 1/1992 |
| JP | 363268945 | * | 11/1988 |
| JP | 2000-131061 A | | 5/2000 |
| JP | 2002-267443 A | | 9/2002 |
| JP | 2005-230340 A | | 9/2005 |
| JP | 2008249771 | * | 10/2008 |
| JP | 2012-237719 A | | 12/2012 |

* cited by examiner

FIG.7

| TIME | TRAVELING STATE | TRAVELING ENVIRONMENT |
|---|---|---|
| t1 | STATIONARY | |
| t2 | WALKING | FLAT |
| t3 | WALKING | SLOPE |
| t4 | WALKING | FLAT |
| t5 | STATIONARY | |
| ... | ... | ... |

MOBILE ELECTRONIC DEVICE, CONTROLLING METHOD, AND CONTROL PROGRAM FOR COMPUTER

The present application is a National Phase entry of International Application No. PCT/JP2014/083605, filed Dec. 18, 2014, which claims priority of Japanese Application No. 2013-265689, filed Dec. 24, 2013.

FIELD

The present application relates to a mobile electronic device, a controlling method, and a control program for computer (hereinafter, "control program").

BACKGROUND

Some mobile electronic devices such as mobile phones and smartphones have an atmospheric pressure sensor installed therein. For example, Patent Literature 1 discloses a mobile electronic device having an atmospheric pressure sensor installed therein.

CITATION LIST

Patent Literature

Patent Literature 1: Japanese Laid-open Patent Publication No. 2005-230340

SUMMARY

Some of the abovementioned mobile electronic devices are configured to be able to detect a change in the altitude by detecting a change in the atmospheric pressure by the atmospheric pressure sensor.

According to embodiments, there is provided a mobile electronic device comprising: an atmospheric pressure sensor configured to detect atmospheric pressure; an acceleration sensor configured to detect acceleration; and a controller configured to detect traveling of the mobile electronic device on a basis of the acceleration, wherein the controller is configured to calculate a change in an altitude of the mobile electronic device by correcting a change in the atmospheric pressure observed while the mobile electronic device is traveling, on a basis of a change in the atmospheric pressure observed while the mobile electronic device is not traveling.

According to embodiments, there is provided a controlling method for controlling a mobile electronic device that includes an atmospheric pressure sensor and an acceleration sensor, the controlling method comprising steps of: detecting atmospheric pressure acting on the mobile electronic device by employing the atmospheric pressure sensor; detecting acceleration acting on the mobile electronic device by employing the acceleration sensor; detecting traveling of the mobile electronic device on a basis of the acceleration; and calculating a change in an altitude of the mobile electronic device by correcting a change in the atmospheric pressure observed while the mobile electronic device is traveling, on a basis of a change in the atmospheric pressure observed while the mobile electronic device is not traveling.

According to embodiments, there is provided a non-transitory storage medium that stores a control program for a computer configured to cause a mobile electronic device that includes an atmospheric pressure sensor and an acceleration sensor to execute steps of: detecting atmospheric pressure acting on the mobile electronic device by employing the atmospheric pressure sensor; detecting acceleration acting on the mobile electronic device by employing the acceleration sensor; detecting traveling of the mobile electronic device on a basis of the acceleration; and calculating a change in an altitude of the mobile electronic device by correcting a change in the atmospheric pressure observed while the mobile electronic device is traveling, on a basis of a change in the atmospheric pressure observed while the mobile electronic device is not traveling.

BRIEF DESCRIPTION OF DRAWINGS

FIG. 7 is a table illustrating examples of state data.

DESCRIPTION OF EMBODIMENTS

A plurality of embodiments for realizing an electronic device, a controlling method, and a control program of the present application will be explained in detail, with reference to the accompanying drawings. In the following sections, a smartphone will be explained as an example of a mobile electronic device.

Embodiments

Figure 1:
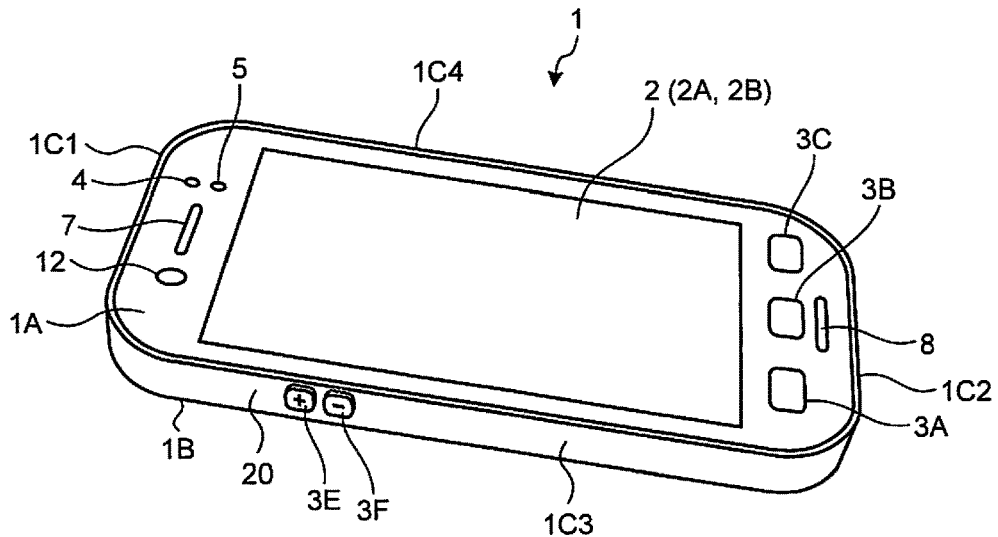
FIG. 1 is a perspective view of a smartphone according to one of a plurality of embodiments.
Figure 2:
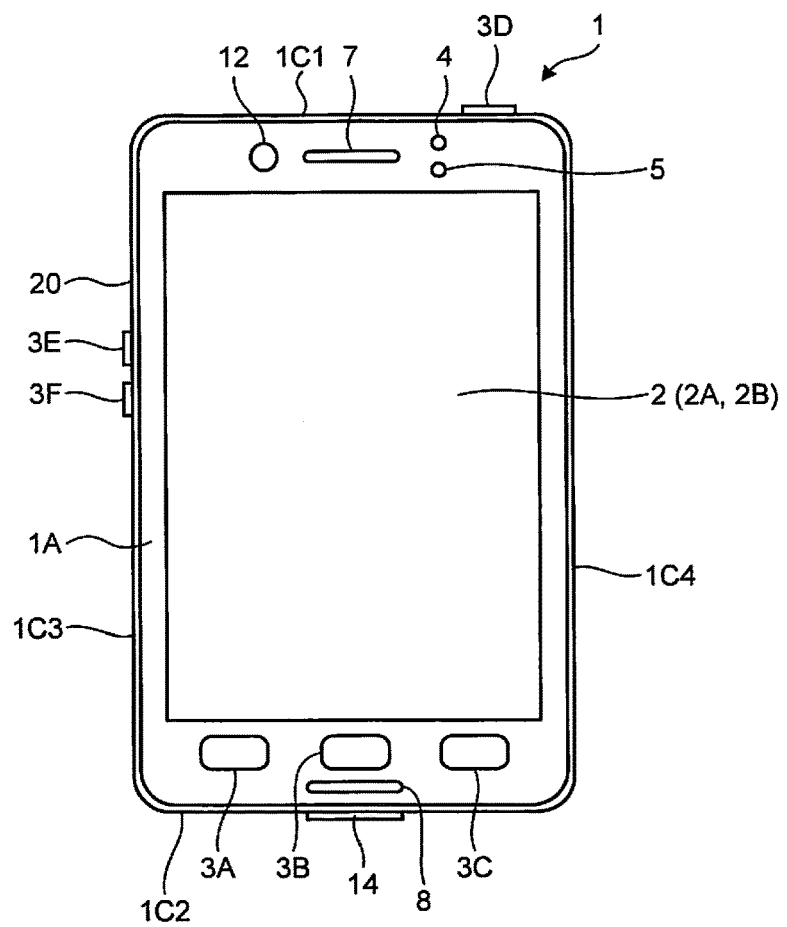
FIG. 2 is a front view of the smartphone.
Figure 3:
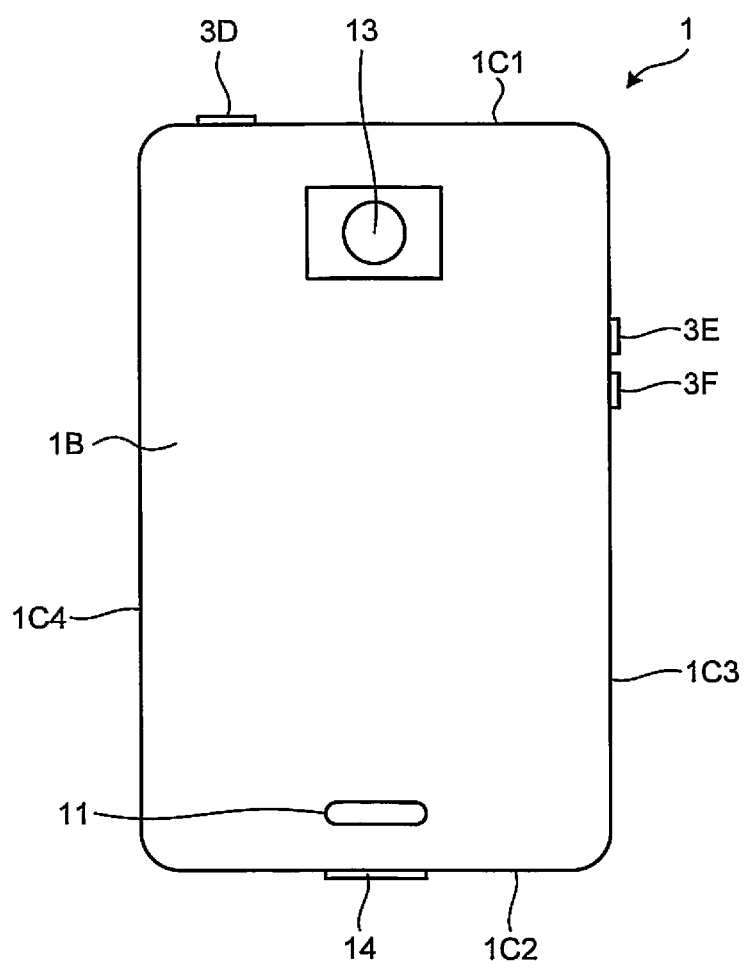
FIG. 3 is a rear view of the smartphone.

An overall configuration of a smartphone 1 according to an example of the embodiments will be explained, with reference to FIGS. 1 to 3. As illustrated in FIGS. 1 to 3, the smartphone 1 includes a housing 20. The housing 20 includes a front face 1A, a rear face 1B, and side faces 1C1 to 1C4. The front face 1A is the face positioned on the front of the housing 20. The rear face 1B is the face positioned on the rear of the housing 20. The side faces 1C1 to 1C4 are lateral faces connecting the front face 1A and the rear face 1B together. In the following explanation, the side faces 1C1 to 1C4 may collectively be referred to as side faces 1C, without any particular one of the side faces being specified.

The smartphone 1 has, on the front face 1A thereof, a touch screen display 2, buttons 3A to 3C, an illuminance sensor 4, a proximity sensor 5, a receiver 7, a microphone 8, and a camera 12. Further, the smartphone 1 has, on the rear face 1B thereof, a speaker 11 and a camera 13. Also, the smartphone 1 has, on the side faces 1C thereof, buttons 3D to 3F and a connector 14. In the following explanation, the buttons 3A to 3F may collectively be referred to as buttons 3, without any particular one of the buttons being specified.

The touch screen display 2 includes a display 2A and a touch screen 2B. In the example illustrated in FIG. 1, the display 2A and the touch screen 2B each have a substantially rectangular shape; however, the shapes of the display 2A and the touch screen 2B are not limited to the shapes in the present example. The display 2A and the touch screen 2B may each have any shape such as a square or a circular shape. In the example illustrated in FIG. 1, the display 2A and the touch screen 2B are positioned on top of each other; however, the positional arrangement of the display 2A and the touch screen 2B is not limited to the one in the present example. For instance, the display 2A and the touch screen 2B may be positioned side by side or may be positioned apart from each other. In the example illustrated in FIG. 1, the long sides of the display 2A extend along the long sides of the touch screen 2B, whereas the short sides of the display 2A extend along the short sides of the touch screen 2B; however, the manner in which the display 2A and the touch screen 2B are positioned on top of each other is not limited to the one in the present example. For instance, when the display 2A and the touch screen 2B are positioned on top of each other, one or more of the sides of the display 2A do not have to extend along any of the sides of the touch screen 2B.

The display 2A includes a display device configured with a Liquid Crystal Display (LCD), an Organic Electro-Luminescence Display (OELD), an Inorganic Electro-Luminescence Display, or the like. The display 2A displays text, an image, a symbol, a figure, and the like.

The touch screen 2B detects contact made by a finger, a pen, a stylus pen, or the like with the touch screen 2B. The touch screen 2B is capable of detecting the positions in which a plurality of fingers, pens, stylus pens, or the like are in contact with the touch screen 2B. In the following explanation, the fingers, the pens, the stylus pens, or the like that come into contact with the touch screen 2B may be referred to as "the contacting object" or "the object that is in contact".

The detection method implemented by the touch screen 2B may be an arbitrary method, such as a capacitance method, a resistive film method, a surface acoustic wave method (or an ultrasound wave method), an infra-red ray method, an electromagnetic induction method, a load detection method, or the like. The following explanation is based on the assumption that, for the purpose of keeping the explanation simple, a user touches the touch screen 2B with his/her one or more fingers, to operate the smartphone 1.

The smartphone 1 discriminates the type of a gesture, on the basis of at least one selected from among: the contact detected by the touch screen 2B, the position in which the contact is detected, a change of the position in which the contact is detected, an interval with which contacting actions are detected, and the number of times contact is detected. The gesture denotes an operation performed on the touch screen 2B. Examples of the gesture that can be discriminated by the smartphone 1 include, but are not limited to, a touch, a long touch, a release, a swipe, a tap, a double tap, a long tap, a drag, a flick, a pinch-in, and a pinch-out.

The "touch" denotes a gesture in which a finger touches the touch screen 2B. The smartphone 1 discriminates the gesture in which a finger touches the touch screen 2B as a touch. A "long touch" denotes a gesture in which a finger touches the touch screen 2B for a time period longer than a predetermined length. The smartphone 1 discriminates the gesture in which a finger touches the touch screen 2B for a time period longer than the predetermined length as a long touch.

The "release" denotes a gesture in which a finger leaves the touch screen 2B. The smartphone 1 discriminates the gesture in which a finger leaves the touch screen 2B as a release. The "swipe" denotes a gesture in which a finger moves while being in contact with the touch screen 2B. The smartphone 1 discriminates the gesture in which a finger moves while being in contact with the touch screen 2B as a swipe.

The "tap" denotes a gesture in which a touch is followed by a release. The smartphone 1 discriminates the gesture in which a touch is followed by a release, as a tap. The "double tap" denotes a gesture in which the gesture where a touch is followed by a release is performed twice in a row. The smartphone 1 discriminates the gesture in which the gesture where a touch is followed by a release is performed twice in a row, as a double tap.

The "long tap" denotes a gesture in which a long touch is followed by a release. The smartphone 1 discriminates the gesture in which a long touch is followed by a release, as a long tap. The "drag" denotes a gesture in which a swipe is performed starting from an area where a movable object is being displayed. The smartphone 1 discriminates the gesture in which a swipe is performed starting from an area where a movable object is being displayed, as a drag.

The "flick" denotes a gesture in which a finger touches the touch screen 2B and subsequently leaves the touch screen 2B while moving. In other words, the "flick" denotes a gesture in which a touch is followed by a release performed while the finger is moving. The smartphone 1 discriminates the gesture in which a finger touches the touch screen 2B and subsequently leaves the touch screen 2B while moving, as a flick. The flick is often performed while the finger is moving in one direction. Examples of the flick include, but are not limited to, an "upward flick" in which the finger moves toward the upper side of the screen, a "downward flick" in which the finger moves toward the lower side of the screen, a "right flick" in which the finger moves toward the right side of the screen, and a "left flick" in which the finger moves toward the left side of the screen. The move of the finger during a flick is often quicker than the move of the finger during a swipe.

The "pinch-in" denotes a gesture in which two or more fingers perform a swipe in the directions to approach one another. The smartphone 1 discriminates the gesture which is detected by the touch screen 2B and in which the distance between the position of one finger and the position/positions of another finger/other fingers becomes shorter, as a pinch-in. The "pinch-out" denotes a gesture in which two or more fingers perform a swipe in the directions to move away from one another. The smartphone 1 discriminates the gesture which is detected by the touch screen 2B and in which the distance between the position of one finger and the position/positions of another finger/other fingers becomes longer, as a pinch-out.

In the following explanations, a gesture performed by a single finger may be referred to as a "single-touch gesture", whereas a gesture performed by two or more fingers may be referred to as a "multi-touch gesture". Examples of the multi-touch gesture include, but are not limited to, a pinch-in and a pinch-out. As for a tap, a flick, a swipe, and the like, the gesture is considered as a single-touch gesture if the gesture is performed by a single finger and is considered as a multi-touch gesture if the gesture is performed by two or more fingers.

The smartphone 1 operates according to any of the gestures discriminated via the touch screen 2B. Thus, the smartphone 1 is able to realize operability that is intuitive and easy-to-use for the user. Operations performed by the smartphone 1 according to discriminated gestures may vary depending on the screen being displayed on the display 2A. In the following explanation, for the purpose of keeping the explanation simple, the situation in which "the touch screen 2B detects contact, and the smartphone 1 discriminates the type of the gesture as X on the basis of the detected contact" may be expressed as "the smartphone 1 detects X" or as "a controller detects X".

Figure 4:
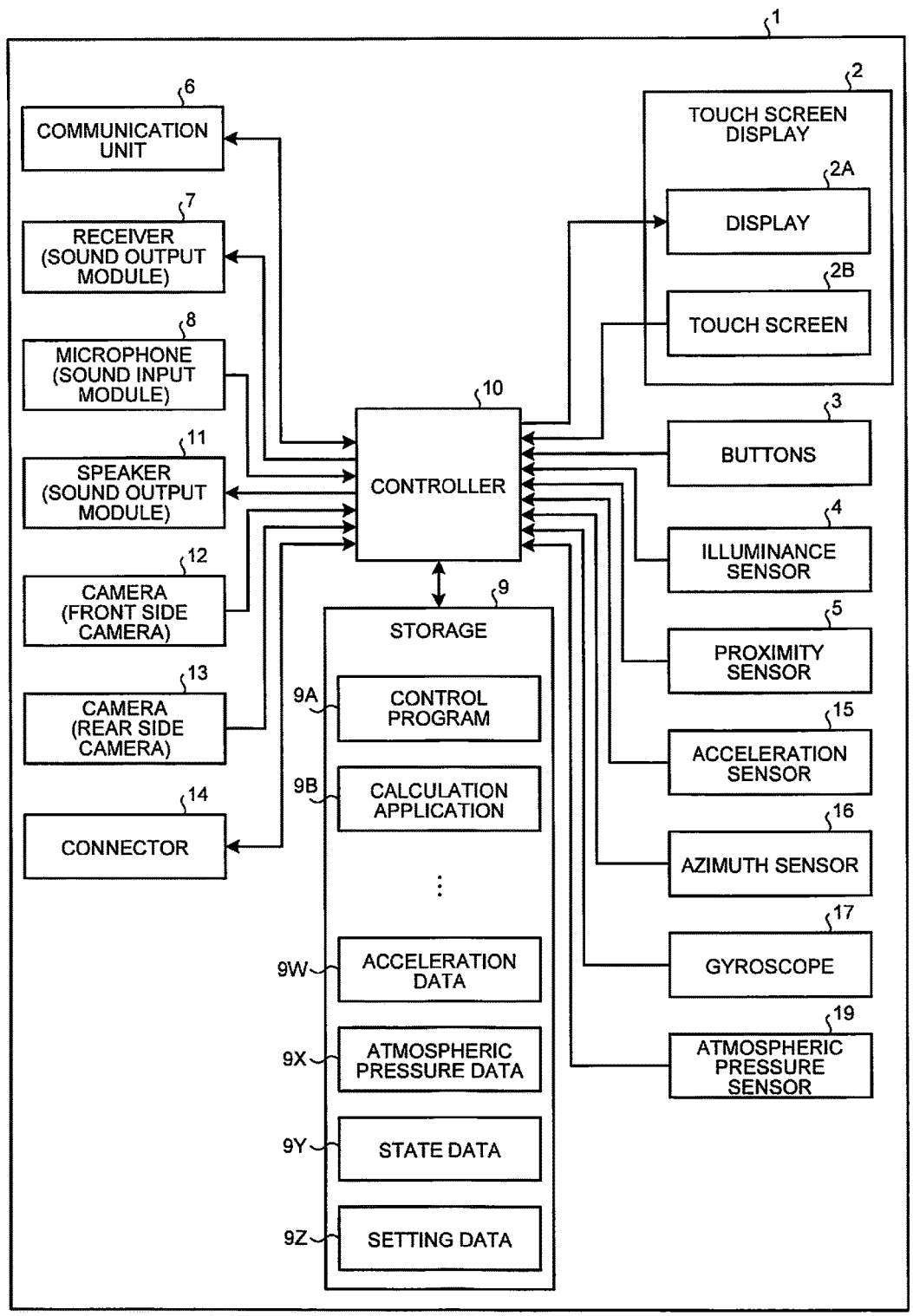
FIG. 4 is a block diagram of the smartphone.

FIG. 4 is a block diagram of the smartphone 1. The smartphone 1 includes the touch screen display 2, the buttons 3, the illuminance sensor 4, the proximity sensor 5, a communication unit 6, the receiver 7, the microphone 8, a storage 9, a controller 10, the speaker 11, the cameras 12 and 13, the connector 14, an acceleration sensor 15, an azimuth sensor 16, a gyroscope 17, and an atmospheric pressure sensor 19.

As explained above, the touch screen display 2 includes the display 2A and the touch screen 2B. The display 2A displays text, an image, a symbol, a figure, or the like. The touch screen 2B detects contact. The controller 10 detects any of the gestures performed on the smartphone 1. More specifically, the controller 10 detects each operation (each of the gestures) performed on the touch screen 2B (the touch screen display 2), in collaboration with the touch screen 2B.

The buttons 3 are operated by the user. The buttons 3 include the buttons 3A to 3F. The controller 10 detects each of the operations performed on any of the buttons 3, in collaboration with the buttons 3. Examples of the operations performed on the buttons 3 include, but are not limited to, a click, a double click, a triple click, a push, and a multi push.

The buttons 3A to 3C may be, for example, a home button, a back button, and a menu button. The button 3D may be, for example, a power on/off button for the smartphone 1. The button 3D may also serve as a sleep/cancel-sleep button. The buttons 3E and 3F may be sound volume buttons, for example.

The illuminance sensor 4 detects the illuminance of ambient light of the smartphone 1. The illuminance denotes intensity, brightness, or luminance of the light. For example, the illuminance sensor 4 is used for adjusting the luminance of the display 2A. The proximity sensor 5 detects the presence of an object positioned in proximity thereto, in a non-contact manner. The proximity sensor 5 detects the presence of the object on the basis of a change in the magnetic field, a change in a return time of a reflective wave of an ultrasound wave, or the like. For example, the proximity sensor 5 detects that the touch screen display 2 is brought into proximity to the face of a person. The illuminance sensor 4 and the proximity sensor 5 may be configured as a single sensor. The illuminance sensor 4 may be used as a proximity sensor.

The communication unit 6 performs communication in a wireless manner. A communication method supported by the communication unit 6 is based on a wireless communication standard. Examples of the wireless communication standard include, but are not limited to, cellular phone communication standards of 2G, 3G, 4G, and the like. Examples of the cellular phone communication standards include, but are not limited to, Long Term Evolution (LTE), Wideband Code Division Multiple Access (W-CDMA), CDMA 2000, Personal Digital Cellular (PDC), Global System for Mobile Communications (GSM) (registered trademark), and Personal Handy-phone System (PHS). Examples of the wireless communication standard further include, but are not limited to, Worldwide Interoperability for Microwave Access (Wi-MAX), Institute for Electrical and Electronics Engineers (IEEE) 802.11, Bluetooth (registered trademark), Infrared Data Association (IrDA), and Near Field Communication (NFC). The communication unit 6 may support one or more of the communication standards listed above.

The receiver 7 and the speaker 11 are each a sound output module. The receiver 7 and the speaker 11 each output a sound signal transmitted thereto from the controller 10, as a sound. For example, the receiver 7 is used for outputting voice of a communicating partner during a telephone call. For example, the speaker 11 is used for outputting a ringtone and music. One of the receiver 7 and the speaker 11 may offer the functions of the other. The microphone 8 is a sound input module. The microphone 8 converts voice of the user or the like into a sound signal and transmits the sound signal to the controller 10.

The storage 9 stores therein computer programs (hereinafter, "programs") and data. The storage 9 may also be used as a work area that temporarily stores therein processing results of the controller 10. The storage 9 may include an arbitrary non-transitory storage medium such as a semiconductor storage medium, a magnetic storage medium, or the like. The storage 9 may include a plurality of types of storage media. The storage 9 may include a combination made up of a portable storage medium such as a memory card, an optical disc, a magneto-optic disc, or the like and a storage medium reading device. The storage 9 may include a storage device used as a temporary storage region such as a Random Access Memory (RAM).

The programs stored in the storage 9 include an application executed in the foreground or in the background and a control program that assists operations of the application. For example, the application causes the display 2A to display a screen and causes the controller 10 to execute a process corresponding to the gesture detected via the touch screen 2B. The control program may be an Operating System (OS), for example. The application and the control program may be installed in the storage 9 via a wireless communication through the communication unit 6 or a non-transitory storage medium.

For example, the storage 9 stores therein a control program 9A, a calculation application 9B, acceleration data 9W, atmospheric pressure data 9X, state data 9Y, and setting data 9Z. For example, the calculation application 9B provides a function of calculating an energy consumption amount during traveling of the user having the smartphone 1. The acceleration data 9W includes information indicating acceleration acting on the smartphone 1. The atmospheric pressure data 9X includes information indicating atmospheric pressure acting on the smartphone 1. The state data 9Y includes information indicating a traveling state of the user of the smartphone 1. The setting data 9Z includes information about various types of settings related to operations of the smartphone 1.

The control program 9A provides functions related to various types of control to bring the smartphone 1 into operation. For example, by controlling the communication unit 6, the receiver 7, the microphone 8, and the like, the control program 9A realizes a telephone call. The functions provided by the control program 9A include a function of exercising various types of control such as changing information displayed on the display 2A in accordance with a gesture detected via the touch screen 2B. The functions provided by the control program 9A include a function of detecting traveling, stopping, and the like of the user having the smartphone 1, by controlling the acceleration sensor 15, the atmospheric pressure sensor 19, and the like. Any of the functions provided by the control program 9A may be used in combination with a function provided by another program such as the calculation application 9B, or the like.

The control program 9A provides a function of determining whether the user (a subject) having the smartphone 1 (the mobile electronic device) is traveling by a predetermined traveling method, on the basis of an acceleration value detected by the acceleration sensor 15. Examples of the traveling method include, but are not limited to, first traveling method by which the user travels on his/her own and second traveling method by which the user is helped to travel by a transportation. Examples of the first traveling method include, but are not limited to, a method by which the user travels on his/her own such as walking, running, and bicycling. Examples of the second traveling method include, but are not limited to, a method by which the user is helped to travel by a transportation such as an automobile, a train, an elevator, an escalator, or the like. The control program 9A determines that the user is traveling on the basis of an acceleration value detected by the acceleration sensor 15 and thus determines that the smartphone 1 is traveling.

The calculation application 9B is, for example, used for calculating an amount of energy consumed by the user. The calculation application 9B, for example, provides a function of calculating the consumption amount of the user, by applying a traveling speed of the user, to a relational expression between the traveling speed (the number of steps) of the user and the amount of consumed energy. The amount of energy consumed by the user may be calculated while taking the traveling method of the user into consideration. For example, the calculation application 9B may switch the relational expression used for calculating the amount of consumed energy, depending on whether the user is walking or running for the same number of steps. The amount of energy consumed by the user may be calculated while taking the traveling environment of the user into consideration. For example, the calculation application 9B may switch the relational expression used for calculating the amount of consumed energy, depending on whether the road on which the user is walking is flat or uphill for the same number of steps. As the amount of consumed energy, for example, thermodynamic calories (cal) may be used as "a measurement for the amount of energy of substances ingested by a person or an animal, or the amount of energy consumed in the metabolism of a person or an animal", on the basis of the Japanese Measurement Act. However, the measurement for the amount of consumed energy is not limited to this example. It is also acceptable to adopt joules (J) on the basis of la Conference General Des Poids et Mesures (CGPM).

What can be calculated by the calculation application 9B is not limited to the amount of energy consumed by the user. The calculation application 9B may calculate an exercise amount of the user or the number of steps taken by the user when traveling by walking. The term "exercise amount" denotes a unit expressing an amount of physical activity. The exercise amount is represented by an amount of physical movements calculated by multiplying Metabolic Equivalents of Task (METs) (explained later) by a time period during which the physical activity is carried out. MET is a unit expressing the intensity of physical activities. The intensity of physical activities varies for each type of physical activities. A MET value may be set for each of traveling methods of the user, for example. MET may be used for calculating an amount of consumed energy, which is an activity factor indicating the amount of activity. A MET value is expressed as a ratio with respect to the intensity of physical activity observed when a person is at rest. For example, it is known that the state in which a person is sitting down and at rest corresponds to 1 MET, whereas normal walking corresponds to 3 METs. In other words, it means that the intensity of the physical activity during normal walking is three times higher than the intensity of the physical activity observed when the person is at rest.

In the acceleration data 9W, a plurality of pieces of acceleration information are stored in a time series. Each of the pieces of acceleration information includes items such as a time and an acceleration value. The time denotes the time at which the acceleration is detected by the acceleration sensor 15. The acceleration value denotes a value of the acceleration detected by the acceleration sensor 15.

In the atmospheric pressure data 9X, a plurality of pieces of atmospheric pressure information are stored in a time series. Each of the pieces of atmospheric pressure information includes items such as a time, an atmospheric pressure value, and an amount of change in the atmospheric pressure. The time denotes the time at which the atmospheric pressure is detected by the atmospheric pressure sensor 19. The atmospheric pressure denotes a value of the atmospheric pressure detected by the atmospheric pressure sensor 19. The amount of change in the atmospheric pressure denotes an amount of change in the atmospheric pressure per unit time period detected by the atmospheric pressure sensor 19.

In the state data 9Y, a plurality of pieces of state information are stored. Details of the state data 9Y will be explained later.

The setting data 9Z includes determination condition data used for performing a determining process related to traveling of the smartphone 1. The determination condition data includes a condition used by the control program 9A to determine whether the user having the device (the smartphone 1) is traveling by using a predetermined traveling method, on the basis of the acceleration value detected by the acceleration sensor 15. For example, the determination condition data includes an oscillation pattern of the acceleration based on a direction and a magnitude of the acceleration acting on the smartphone 1 while the user is traveling by using the predetermined traveling method, as well as the direction and a range of the magnitude of the acceleration.

The controller 10 is an arithmetic processing unit. Examples of the arithmetic processing unit include, but are not limited to, a Central Processing Unit (CPU), a System-on-a-Chip (SoC), a Micro Control Unit (MCU), a Field Programmable Gate Array (FPGA), and a Co-processor. The controller 10 realizes various types of functions by integrally controlling operations of the smartphone 1.

More specifically, the controller 10 executes commands included in any of programs stored in the storage 9, while referring to data stored in the storage 9, as necessary. Further, the controller 10 controls functional modules according to the data and the commands and thereby realizes the various types of functions. Examples of the functional modules include, but are not limited to, the display 2A, the communication unit 6, the receiver 7, and the speaker 11. The controller 10 may change the control in accordance with a detection result obtained by a detecting module. Examples of the detecting module include, but are not limited to, the touch screen 2B, the buttons 3, the illuminance sensor 4, the proximity sensor 5, the microphone 8, the camera 12, the camera 13, the acceleration sensor 15, the azimuth sensor 16, the gyroscope 17, and the atmospheric pressure sensor 19.

By executing the control program 9A, for example, the controller 10 exercises various types of control such as changing information displayed on the display 2A in accordance with a gesture detected via the touch screen 2B.

The camera 12 is a front side camera that takes an image of an object facing the front face 1A. The camera 13 is a rear side camera that takes an image of an object facing the rear face 1B.

The connector 14 is a terminal to which another device can be connected. The connector 14 may be a generally-used terminal such as a Universal Serial Bus (USB) terminal, a High-Definition Multimedia Interface (HDMI) (registered trademark) terminal, a Light Peak (Thunderbolt (registered trademark)) terminal, or an earphone/microphone connector. The connector 14 may be an exclusive-use terminal such as a dock connector. Examples of the device that can be connected to the connector 14 include, but are not limited to, an external storage device, a speaker, and a communication device.

The acceleration sensor 15 detects a direction and a magnitude of the acceleration acting on the smartphone 1. The azimuth sensor 16 detects a direction of terrestrial magnetism. The gyroscope 17 detects an angle and an angular velocity of the smartphone 1. The atmospheric pressure sensor 19 detects atmospheric pressure acting on the smartphone 1. Detection results obtained by the acceleration sensor 15, the azimuth sensor 16, the gyroscope 17, and the atmospheric pressure sensor 19 are used in combination for detecting changes in the position and the attitude of the smartphone 1.

A part or all of the programs and the data stored in the storage 9 illustrated in FIG. 4 may be downloaded from another device through a wireless communication performed by the communication unit 6. A part or all of the programs and the data stored in the storage 9 illustrated in FIG. 4 may be stored in a non-transitory storage medium from which a reading device included in the storage 9 is able to read information. A part or all of the programs and the data stored in the storage 9 illustrated in FIG. 4 may be stored in a non-transitory storage medium from which a reading device connected to the connector 14 is able to read information. Examples of the non-transitory storage medium include, but are not limited to, an optical disc such as a Compact Disc (CD) (registered trademark), a Digital Versatile Disc (DVD) (registered trademark), a Blu-ray (registered trademark) disc, or the like, a magneto-optical disc, a magnetic storage medium, a memory card, and a solid state storage medium.

The configuration of the smartphone 1 illustrated in FIG. 4 is merely an example and may be modified as appropriate without departing from the gist of embodiments. For example, the number and the types of the buttons 3 are not limited to those in the example illustrated in FIG. 4. As buttons used for performing operations related to a screen, the smartphone 1 may include buttons in a ten-key formation or in a QWERTY formation, in place of the buttons 3A to 3C. For operations related to a screen, the smartphone 1 may include only one button or may include no button. In the example illustrated in FIG. 4, the smartphone 1 includes the two cameras; however, the smartphone 1 may include only one camera or may include no camera. In the example illustrated in FIG. 4, the smartphone 1 includes the four types of sensors to detect the position and the attitude thereof; however, the smartphone 1 does not have to include all of the four types of sensors. Alternatively, the smartphone 1 may include another type of sensor to detect one or both of the position and the attitude thereof.

Next, an example of control by the smartphone 1 in relation to detecting a traveling state and a change in altitude will be explained.

The controller 10 included in the smartphone 1 causes the acceleration sensor 15 to detect acceleration and causes the atmospheric pressure sensor 19 to detect atmospheric pressure. Further, the acceleration sensor 15 outputs an acceleration value for each coordinate axis (e.g., x-axis, y-axis, and z-axis) to the controller 10 as an electric current value. The atmospheric pressure sensor 19 outputs an atmospheric pressure value to the controller 10 as an electric current value.

Figure 5:
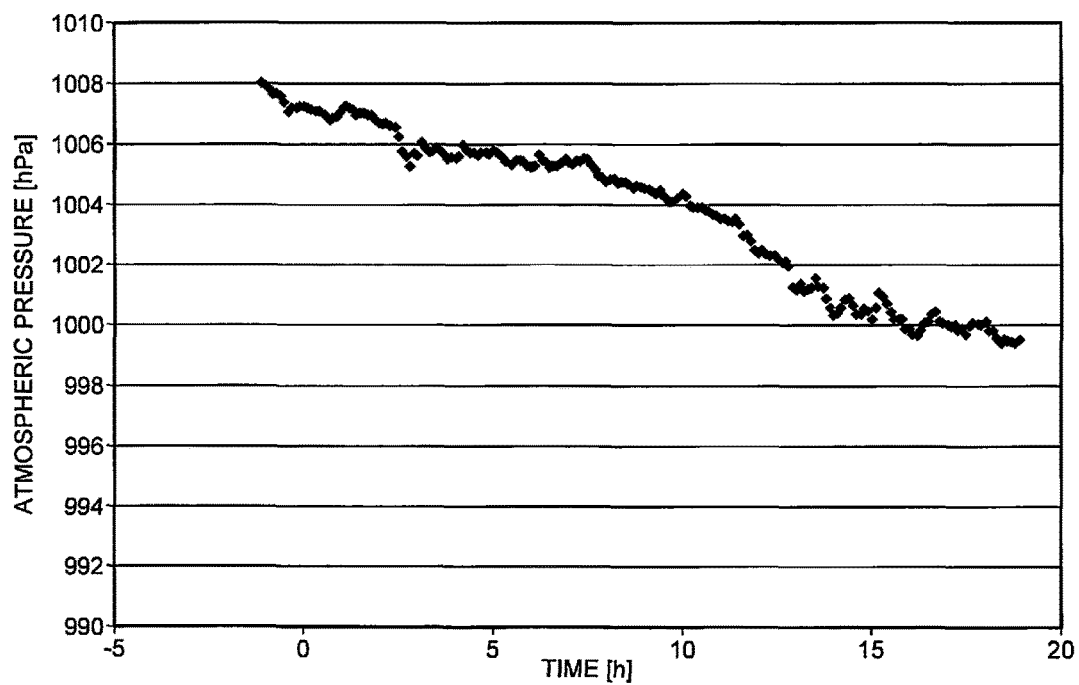
FIG. 5 is a chart illustrating a transition of atmospheric pressure detected by the smartphone on one day.

Generally speaking, atmospheric pressure values are larger at lower altitudes and are smaller at higher altitudes. Further, an amount of change in the atmospheric pressure varies from day to day and from hour to hour. Thus it is difficult to be defined in a generic manner. FIG. 5 is a chart illustrating a transition of the atmospheric pressure detected by the smartphone 1 on one day. FIG. 5 illustrates the transition of the atmospheric pressure detected by the smartphone 1 on a rainy day without any change in the altitude while the smartphone 1 is stationary.

As illustrated in FIG. 5, the atmospheric pressure changes from 1,008 [hPa] to 1,000 [hPa] in the day. If the 8-hPa change in the atmospheric pressure were caused by a change in the altitude, the change in the atmospheric pressure would correspond to an 80-meter change in the altitude. If the user travels while the atmospheric pressure changes as illustrated in FIG. 5, the change in the altitude calculated on the basis of the change in the atmospheric pressure detected by the smartphone 1 may include an error of 80 meters [m] caused by the change in the atmospheric pressure. While being stationary, the smartphone 1 is able to precisely detect the change in the atmospheric pressure caused by the change in the atmospheric pressure. For this reason, the smartphone 1 according to the present aspect of the embodiments is configured to calculate an amount of change in the atmospheric pressure corresponding to the atmospheric fluctuation while the user is stationary and to correct an amount of change in the atmospheric pressure in a traveling state of the user on the basis of the calculated amount of change in the atmospheric pressure. The smartphone 1 is thus able to reduce an error on calculating the change in the altitude based on the change in the atmospheric pressure.

Figure 6:
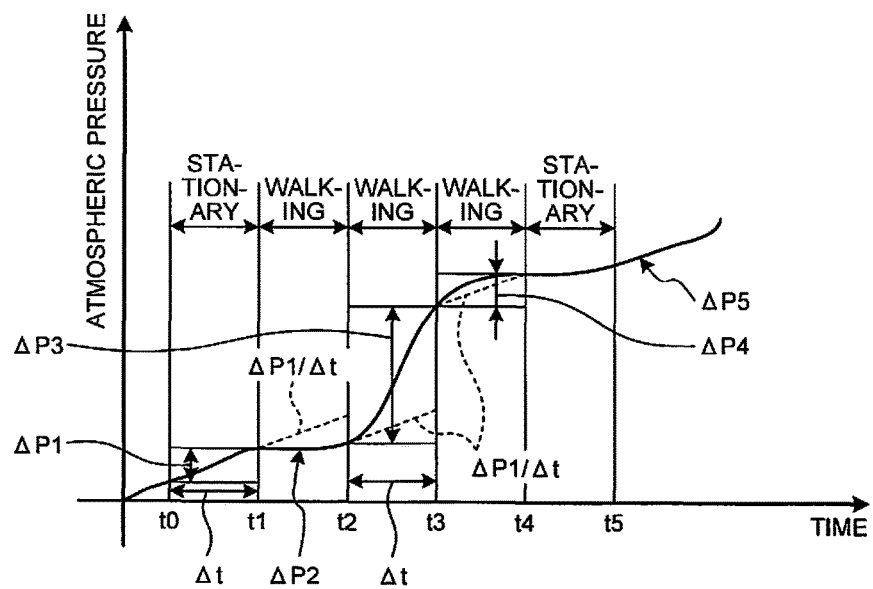
FIG. 6 is a drawing for explaining an example of a relationship among atmospheric pressure, time, and traveling states.

An example of the control by the smartphone 1 in relation to the detection of the atmospheric pressure will be explained, with reference to FIG. 6. FIG. 6 is a drawing for explaining an example of a relationship among atmospheric pressure, time, and traveling states.

The smartphone 1 determines a traveling state of the user (a subject) having the smartphone 1, on the basis of an acceleration value detected by the acceleration sensor 15 for every predetermined period of time. The predetermined period of time denotes a time period indicating a sampling time interval determined to detect acceleration and atmospheric pressure values. The traveling state includes a walking state in which the user is traveling and a stationary state in which the user is not traveling.

When having detected the acceleration value for every predetermined period of time, the smartphone 1 determines whether the user is stationary or walking (traveling), on the basis of the detected acceleration values. By referring to the determination condition data in the setting data 9Z, the smartphone 1 determines whether the acceleration values obtained by the acceleration sensor 15 match an acceleration pattern based on a direction and a magnitude of the acceleration acting on the smartphone 1 during a walk. When the obtained acceleration values match the acceleration pattern, the smartphone 1 determines that the user is walking. Conversely, when the obtained acceleration values do not match the acceleration pattern, the smartphone 1 determines that the user is stationary. The smartphone 1 appends a time stamp to the traveling state representing a determination result and stores it into the state data 9Y.

In the present aspect of the embodiments, the example is explained in which the smartphone 1 determines whether the user is stationary or walking; however, the embodiments are not limited to this example. For instance, the smartphone 1 may be configured to determine a traveling state other than walking. Examples of traveling state other than walking include, but are not limited to, running, traveling by bicycle, by automobile, by train, in an elevator, and on an escalator.

The smartphone 1 calculates an amount of change in the atmospheric pressure per predetermined period of time, on the basis of an atmospheric pressure value detected by the atmospheric pressure sensor 19 for every predetermined period of time. The smartphone 1 appends a time stamp to the atmospheric pressure value and to the calculated amount of change in the atmospheric pressure and stores them into the atmospheric pressure data 9X, as atmospheric pressure information.

As illustrated in FIG. 6, in the time period from time t0 to time t1, the user is in a stationary state, and the atmospheric pressure gradually rises. At time t1, the smartphone 1 determines that the user is in a stationary state, on the basis of an acceleration value detected by the acceleration sensor 15 and the determination condition data. On the basis of atmospheric pressure values detected by the atmospheric pressure sensor 19, the smartphone 1 calculates a first amount of change (hereinafter, "first change amount") in the atmospheric pressure per unit time period expressed as $\Delta P1/\Delta t$, appends a time stamp to the calculated first change amount $\Delta P1/\Delta t$, and stores it into the atmospheric pressure data 9X. The first change amount in the atmospheric pressure indicates the amount of change in the atmospheric pressure observed while the user is in the stationary state.

In the example illustrated in FIG. 6, when the user is in the stationary state from time t0 to time t1, the amount of change in the atmospheric pressure detected by the smartphone 1 does not include any amount of change in the atmospheric pressure caused by a change in the altitude. Thus, the smartphone 1 detects the first change amount $\Delta P1/\Delta t$ as an amount of change in the atmospheric pressure corresponding to the change in the atmospheric pressure.

During the time period from time t1 to time t2, the user is walking on a gradual uphill slope. At time t2, the smartphone 1 determines that the user is in a walking state on the basis of an acceleration value detected by the acceleration sensor 15 and the determination condition data. On the basis of atmospheric pressure values detected by the atmospheric pressure sensor 19, the smartphone 1 calculates a second amount of change (hereinafter, "second change amount") in the atmospheric pressure per unit time period expressed as $\Delta P2/\Delta t$, appends a time stamp to the calculated second change amount $\Delta P2/\Delta t$, and stores it into the atmospheric pressure data 9X. The second change amount indicates the amount of change in the atmospheric pressure observed while the user is in the walking state.

In the example illustrated in FIG. 6, from time t1 to time t2, the user is in the walking state, and the atmospheric pressure hardly changes. Further, there is a low possibility that the atmospheric pressure may change drastically after the predetermined period of time has elapsed. In other words, the amount of change in the atmospheric pressure caused by the atmosphere during the time period from t1 to t2 has a high possibility of being equivalent to the first change amount $\Delta P1/\Delta t$ calculated for the time period from t0 to t1. Accordingly, when the second change amount $\Delta P2/\Delta t$ in the detected atmospheric pressure in the walking state is smaller than the first change amount $\Delta P1/\Delta t$ in the atmospheric pressure in the stationary state, the smartphone 1 determines that small change is caused in the atmospheric pressure by a change in the altitude and that the user is walking in a gradual uphill slope which is regarded as a flat environment, as described later. Further, the smartphone 1 corrects the second change amount $\Delta P2/\Delta t$ by subtracting the first change amount $\Delta P1/\Delta t$ in the atmospheric pressure in the stationary state from the second change amount $\Delta P2/\Delta t$ in the atmospheric pressure in the walking state. In other words, the second change amount $\Delta P2/\Delta t$ in the atmospheric pressure in the walking state is a value obtained by subtracting the amount of change in the atmospheric pressure in the stationary state from the amount of change in the atmospheric pressure in the walking state.

In the present aspect of the embodiments, the smartphone 1 compares the second change amount $\Delta P2/\Delta t$ in the atmospheric pressure with the first change amount $\Delta P1/\Delta t$ in the atmospheric pressure in the last stationary state and further conjectures whether a change has occurred in the altitude of the user on the basis of the result of the comparison. Atmospheric pressure values are larger at lower altitudes and are smaller at higher altitudes. Accordingly, the smartphone 1 conjectures that the user is walking uphill when the amount of change in the atmospheric pressure in the walking state is smaller than the amount of change (a fluctuation amount) in the atmospheric pressure in the stationary state. Conversely, the smartphone 1 conjectures that the user is walking downhill when the amount of change in the atmospheric pressure in the walking state is larger than the amount of change in the atmospheric pressure in the stationary state.

When the difference between the second change amount $\Delta P2/\Delta t$ in the atmospheric pressure in the walking state and the first change amount $\Delta P1/\Delta t$ in the atmospheric pressure in the stationary state does not exceed a threshold value for determining of a slope, the smartphone 1 determines that the user is walking on a gradual slope. Conversely, when the difference between the second change amount $\Delta P2/\Delta t$ and the first change amount $\Delta P1/\Delta t$ exceeds the threshold value for determining of a slope, the smartphone 1 determines that the user is walking on a steep slope. The threshold value for determining of a slope is set on the basis of, for example, the altitude, the angle of inclination of the slope, and the like, which affect the energy consumption amount of the user when the user walks on the slope.

In the example illustrated in FIG. 6, during the time period from time t1 to time t2, the second change amount $\Delta P2/\Delta t$ in the atmospheric pressure in the walking state is smaller than the first change amount $\Delta P1/\Delta t$ in the last stationary state. Accordingly, the smartphone 1 determines that the user is walking on a gradual uphill slope. However, gradual uphill slopes do not affect the energy consumption amount of the user. Thus, the smartphone 1 determines the traveling environment of the user as "flat" and stores information about the traveling environment in association with the acceleration value into the state data 9Y.

In the present aspect of the embodiments, the example is explained in which the smartphone 1 determines whether the uphill and downhill slopes are gradual or steep; however, the embodiments are not limited to this example. For instance, the smartphone 1 may be configured so as determine whether the traveling environment in which the user is walking is an uphill slope or a downhill slope or whether the traveling environment has a slope or not.

During the time period from time t2 to time t3, the user is walking on a steep downhill slope. At time t3, the smartphone 1 determines that the user is in a walking state, on the basis of an acceleration value detected by the acceleration sensor 15 and the determination condition data. On the basis of atmospheric pressure values detected by the atmospheric pressure sensor 19, the smartphone 1 calculates a second change amount $\Delta P3/\Delta t$ in the atmospheric pressure per unit time period, appends a time stamp to the calculated second change amount $\Delta P3/\Delta t$, and stores it into the atmospheric pressure data 9X. After that, the smartphone 1 detects that the second change amount $\Delta P3/\Delta t$ in the atmospheric pressure in the walking state is larger than the first change amount $\Delta P1/\Delta t$ in the stationary state and detects that the difference therebetween exceeds the threshold value for determining of a slope. Accordingly, the smartphone 1 determines that the user is walking on a steep downhill slope, determines the traveling environment of the user as a "slope", and stores information about the traveling environment in association with the acceleration value into the state data 9Y.

During the time period from t3 to t4, the user is walking on a gradual downhill slope. At time t4, the smartphone 1 determines that the user is in a walking state, on the basis of an acceleration value detected by the acceleration sensor 15 and the determination condition data. On the basis of atmospheric pressure values detected by the atmospheric pressure sensor 19, the smartphone 1 calculates a second change amount $\Delta P4/\Delta t$ in the atmospheric pressure per unit time period, appends a time stamp to the calculated second change amount $\Delta P4/\Delta t$, and stores it into the atmospheric pressure data 9X. After that, the smartphone 1 detects that the second change amount $\Delta P4/\Delta t$ in the atmospheric pressure is substantially equal to the first change amount $\Delta P1/\Delta t$ in the stationary state. Accordingly, the smartphone 1 determines that the user is walking on a flat road, determines the traveling environment of the user as "flat", and stores information about the traveling environment in association with the acceleration value into the state data 9Y.

During the time period from time t4 to t5, the user is no longer walking and is stationary, and the atmospheric pressure is not increasing. At time t5, the smartphone 1 determines that the user is in a stationary state, on the basis of an acceleration value detected by the acceleration sensor 15 and the determination condition data. On the basis of atmospheric pressure values detected by the atmospheric pressure sensor 19, the smartphone 1 calculates a first change amount $\Delta P5/\Delta t$ in the atmospheric pressure per unit time period, appends a time stamp to the calculated first change amount $\Delta P5/\Delta t$, and stores it into the atmospheric pressure data 9X. After that, the smartphone 1 performs the process described above in each unit time period.

As explained above, the smartphone 1 corrects the amount of change in the atmospheric pressure observed while the user is traveling, on the basis of the amount of change in the atmospheric pressure in the stationary state of the user before the traveling period and further calculates the change in the altitude of the user on the basis of the corrected amount of change in the atmospheric pressure. With this arrangement, the smartphone 1 is able to reduce the effect of atmospheric change on the change in the atmospheric pressure, when the altitude of the user fluctuates. As a result, the smartphone 1 is able to improve the accuracy in calculating the change in the altitude on the travelling of the user.

Further, by determining the traveling environment of the user on the basis of the change in the altitude, the smartphone 1 is also able to improve the accuracy in determining the traveling environment.

The state data 9Y will be explained, with reference to FIG. 7. FIG. 7 is a table illustrating examples of the state data 9Y. As illustrated in FIG. 7, in the state data 9Y, pieces of state information for every predetermined period of time are stored. Each of the pieces of state information includes items such as a time, a traveling state, and a traveling environment. The time denotes a time at which the acceleration and the atmospheric pressure are detected. The traveling state denotes a traveling state of the user having the smartphone 1. The traveling environment denotes an environment of the user who is walking.

In the example illustrated in FIG. 7, the state data 9Y includes the pieces of state information corresponding to the times t1 to t5 described above. In the example illustrated in FIG. 7, "stationary", "walking", "walking", "walking", and "stationary" are set as the traveling states at time t1, time t2, time t3, time t4, and time t5, respectively. Further, "flat", "slope", and "flat" are set as the traveling environments at time t2, time t3, and time t4, respectively. Further, since the traveling states at time t1 and time t5 are stationary, no traveling environment is set for these times.

The state information is not limited to the examples illustrated in FIG. 7. For instance, the state information may include an item that supplementarily indicates whether the slope is uphill or downhill when the traveling environment is a slope. As another example, the state information may include other items such as an amount of change in the atmospheric pressure, an amount of change in the altitude, and a consumption amount (calories) of the user for each time period.

An example in which the smartphone 1 calculates a consumption amount of the user will be explained. The smartphone 1 executes the calculation application 9B and conjectures a traveling speed of the user on the basis of an acceleration value for each unit time period. For example, the smartphone 1 calculates the number of steps taken by the user on the basis of an acceleration value in the up-and-down vertical direction and conjectures the traveling speed on the basis of the calculated number of steps. The smartphone 1 calculates a change in the altitude of the user on walking, by applying an amount of change in the atmospheric pressure per unit time period to an altitude calculation expression. The altitude calculation expression is a calculation expression used for calculating a change in the altitude from an amount of change in the atmospheric pressure. Further, the smartphone 1 calculates a consumption amount of the user on the basis of the corrected atmospheric pressure data 9X, the state data 9Y, and a relational expression indicating a relationship between the traveling speed and the energy consumption amount corresponding to the traveling environment of the user, the change in the altitude, and the like. With this arrangement, the smartphone 1 is able to improve the accuracy in calculating the energy consumption amount, by taking into account the change in the altitude of the user which is calculated based on the change in the atmospheric pressure without the change in the atmospheric pressure caused by the atmospheric changes.

Figure 8:
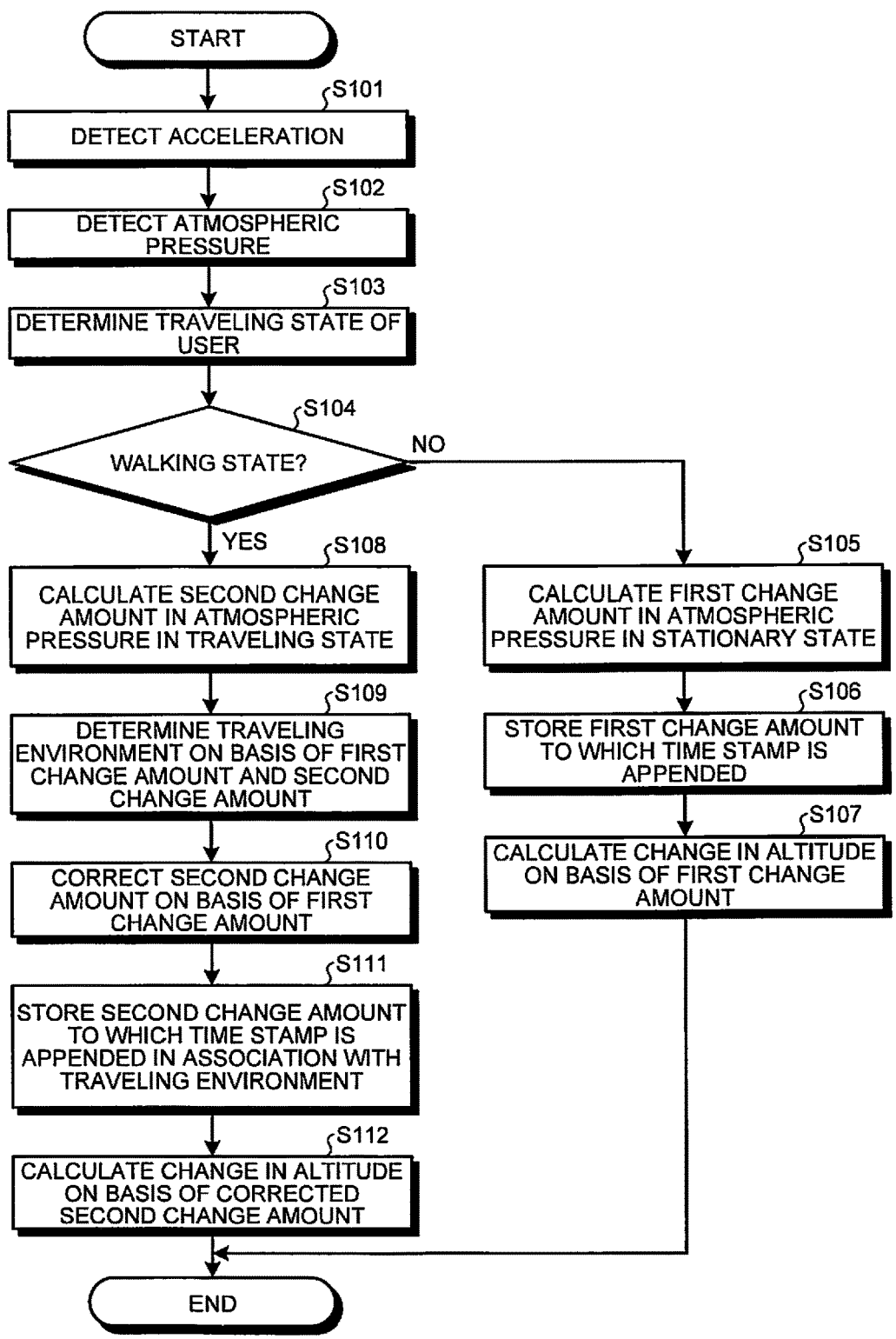
FIG. 8 is a flowchart illustrating a processing procedure in an example of control by the smartphone.

A processing procedure in the control by the smartphone 1 will be explained with reference to FIG. 8. FIG. 8 is a flowchart illustrating the processing procedure in an example of control by the smartphone 1. The processing procedure illustrated in FIG. 8 is realized as a result of the controller 10 executing the control program 9A. The processing procedure illustrated in FIG. 8 is repeatedly performed for every predetermined period of time.

As illustrated in FIG. 8, at Step S101, the controller 10 included in the smartphone 1 causes the acceleration sensor 15 to detect acceleration, appends a time stamp to acceleration information indicating the acceleration value detected by the acceleration sensor 15, and stores it into the acceleration data 9W. At Step S102, the controller 10 causes the atmospheric pressure sensor 19 to detect atmospheric pressure, appends a time stamp to atmospheric pressure information indicating the atmospheric pressure value detected by the atmospheric pressure sensor 19, and stores it into the atmospheric pressure data 9X.

At Step S103, the controller 10 determines a traveling state of the user on the basis of the obtained acceleration information and a determination condition data. More specifically, the controller 10 determines whether the user is in a walking state or a stationary state. When it is determined that the user is not in a walking state, i.e., the user is in a stationary state (No at Step S104), the controller 10 proceeds to Step S105.

At Step S105, the controller 10 calculates a first change amount in the atmospheric pressure in the stationary state, on the basis of the atmospheric pressure data 9X. Further, at Step S106, the controller 10 appends a time stamp to the first change amount and stores the time-stamped first change amount into the storage 9. After that, at Step S107, the controller 10 calculates a change in the altitude on the basis of the first change amount and stores the calculated altitude change into the storage 9. Examples of the change in the altitude include, but are not limited to, an amount of change in the altitude, and a value of the altitude after the change. Subsequently, the controller 10 ends the processing procedure illustrated in FIG. 8.

When it is determined that the user is in a walking state (Yes at Step S104), the controller 10 proceeds to Step S108. At Step S108, the controller 10 calculates a second change amount in the atmospheric pressure in the traveling state. Further, at Step S109, the controller 10 determines a traveling environment of the user during the walk, on the basis of the first change amount and the second change amount. After that, at Step S110, the controller 10 corrects the second change amount on the basis of the first change amount. More specifically, the controller 10 subtracts the amount of change in the atmospheric pressure in the stationary state from the amount of change in the atmospheric pressure in the traveling state, by subtracting the first change amount from the second change amount.

Subsequently, at Step S111, the controller 10 stores the second change amount to which a time stamp is appended in association with the traveling environment, into the atmospheric pressure data 9X. After that, at Step S112, the controller 10 calculates a change in the altitude on the basis of the corrected second change amount and stores the calculated altitude change in the storage 9. Subsequently, the controller 10 ends the processing procedure illustrated in FIG. 8.

In the aspect of the embodiments described above, the example is explained in which the smartphone 1 calculates a change in the altitude per unit time period, for every time the smartphone 1 detects acceleration and atmospheric pressure; however, the embodiments are not limited to this example. For instance, the smartphone 1 may be configured so as to calculate a change in the altitude on the basis of an amount of change in the atmospheric pressure in the traveling state, after the user has finished traveling.

The embodiments disclosed herein may be modified without departing from the gist and the scope of the embodiments. Further, any of the embodiments disclosed herein and modification examples thereof may be combined as appropriate. For example, the embodiments described above may be modified as described below.

For example, any of the programs illustrated in FIG. 4 may be divided into a plurality of modules and may be joined with any other program.

Figure 9:
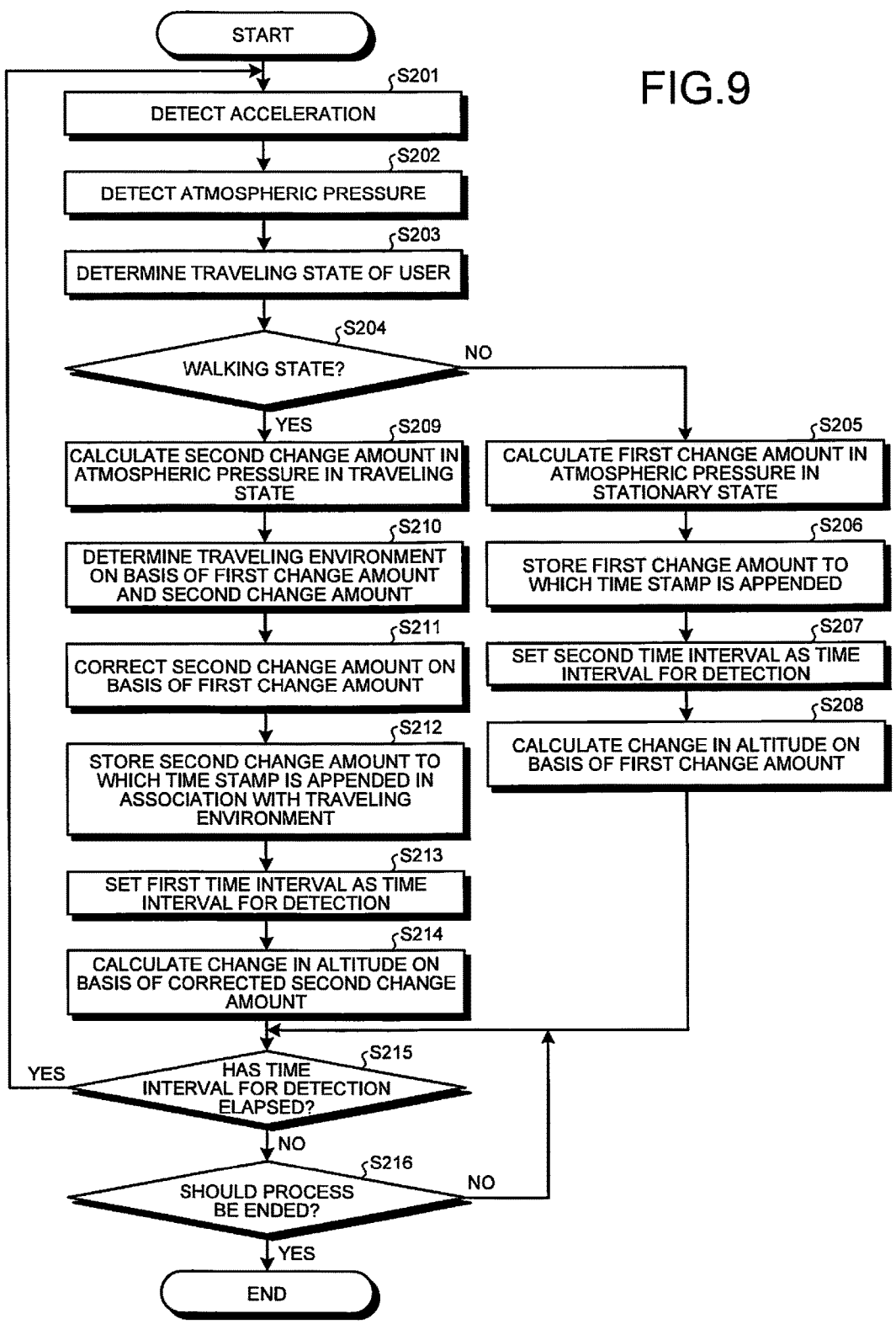
FIG. 9 is a flowchart illustrating a first modification example of the processing procedure in the control by the smartphone.

The aspect of the embodiments described above may be modified so that the smartphone 1 detects acceleration values and atmospheric pressure values for different time intervals on a stationary state of the user and on a walking state of the user respectively. A first modification example of the processing procedure in the control by the smartphone 1 will be explained, with reference to FIG. 9. FIG. 9 is a flowchart illustrating the first modification example of the processing procedure in the control by the smartphone 1. The processing procedure illustrated in FIG. 9 is realized as a result of the controller 10 executing the control program 9A. In the following sections, duplicate explanation may be omitted.

As illustrated in FIG. 9, at Step S201, the controller 10 included in the smartphone 1 causes the acceleration sensor 15 to detect acceleration, appends a time stamp to acceleration information indicating the acceleration value detected by the acceleration sensor 15, and stores the time-stamped information into the acceleration data 9W. At Step S202, the controller 10 causes the atmospheric pressure sensor 19 to detect atmospheric pressure, appends a time stamp to atmospheric pressure information indicating the atmospheric pressure value detected by the atmospheric pressure sensor 19, and stores the time-stamped information into the atmospheric pressure data 9X.

At Step S203, the controller 10 determines a traveling state of the user, on the basis of the obtained acceleration information and a determination condition data. When it is determined that the user is not in a walking state, i.e., the user is in a stationary state (No at Step S204), the controller 10 proceeds to Step S205.

At Step S205, the controller 10 calculates a first change amount in the atmospheric pressure in the stationary state on the basis of the atmospheric pressure data 9X. Further, at Step S206, the controller 10 appends a time stamp to the first change amount and stores the time-stamped first change amount into the storage 9. After that, at Step S207, the controller 10 sets a second time interval as the time interval for the detection in the acceleration sensor 15 and the atmospheric pressure sensor 19. The second time interval is a time period during which the amount of change in the atmospheric pressure is monitored while the user is in a stationary state. More specifically, the controller 10 sets the second time interval as the time interval for the next detection of the acceleration and the atmospheric pressure. After that, at Step S208, the controller 10 calculates a change in the altitude on the basis of the first change amount and stores the calculated change in the altitude into the storage 9. Subsequently, the controller 10 proceeds to Step S215.

At Step S215, the controller 10 determines whether the time interval for the detection has elapsed. When the time interval for the detection has elapsed (Yes at Step S215), the controller 10 returns to Step S201. When the time interval for the detection has not elapsed (No at Step S215), the controller 10 proceeds to Step S216.

At Step S216, the controller 10 determines whether the process should be ended. For example, when having detected an operation to turn off the power of the smartphone 1, the controller 10 determines that the process should be ended. When it is determined that the process should not be ended (No at Step S216), the controller 10 returns to Step S215. When it is determined that the process should be ended (Yes at Step S216), the controller 10 ends the processing procedure illustrated in FIG. 9.

When it is determined that the user is in a walking state (Yes at Step S204), the controller 10 proceeds to Step S209. At Step S209, the controller 10 calculates a second change amount in the atmospheric pressure in the traveling state, on the basis of the atmospheric pressure data 9X. After that, at Step S210, the controller 10 determines a traveling environment of the user during the walk, on the basis of the first change amount and the second change amount. After that, at Step S211, the controller 10 corrects the second change amount on the basis of the first change amount.

Subsequently, at Step S212, the controller 10 stores the second change amount to which a time stamp is appended in association with the traveling environment, into the atmospheric pressure data 9X. After that, at Step S213, the controller 10 sets a first time interval as the time interval for the detection in the acceleration sensor 15 and the atmospheric pressure sensor 19. The first time interval is a time period during which the change in the atmospheric pressure is monitored while the user is in a walking state. The first time interval is longer than the second time interval. After that, at Step S214, the controller 10 calculates a change in the altitude on the basis of the corrected second change amount and stores the calculated change in the altitude into the storage 9. Subsequently, the controller 10 proceeds to Step S215, which has already been explained.

As explained above, the smartphone 1 causes the atmospheric pressure sensor 19 to detect the atmospheric pressure values at the first time interval when the user is walking (traveling) and causes the atmospheric pressure sensor 19 to detect the atmospheric pressure values at the second time interval that are shorter than the first time interval when the user is in the stationary state. With this arrangement, the smartphone 1 is able to reduce the electric power consumption during the traveling, because when the user has transitioned into a walking state, the number of times of driving the atmospheric pressure sensor 19 in the walking state is smaller than the number of times of driving the atmospheric pressure sensor 19 in the stationary state. In addition, by arranging the number of times of detecting the atmospheric pressure in a stationary state to be larger than the number of times of detecting the atmospheric pressure in a traveling state, the smartphone 1 is able to improve the accuracy of determining the change in the atmospheric pressure. As a result, the smartphone 1 is able to determine whether the amount of change in the atmospheric pressure in the stationary state is caused by atmospheric changes, and thus able to subtract the amount of change in the atmospheric pressure in the stationary state from the amount of change in the atmospheric pressure in the traveling state.

Figure 10:
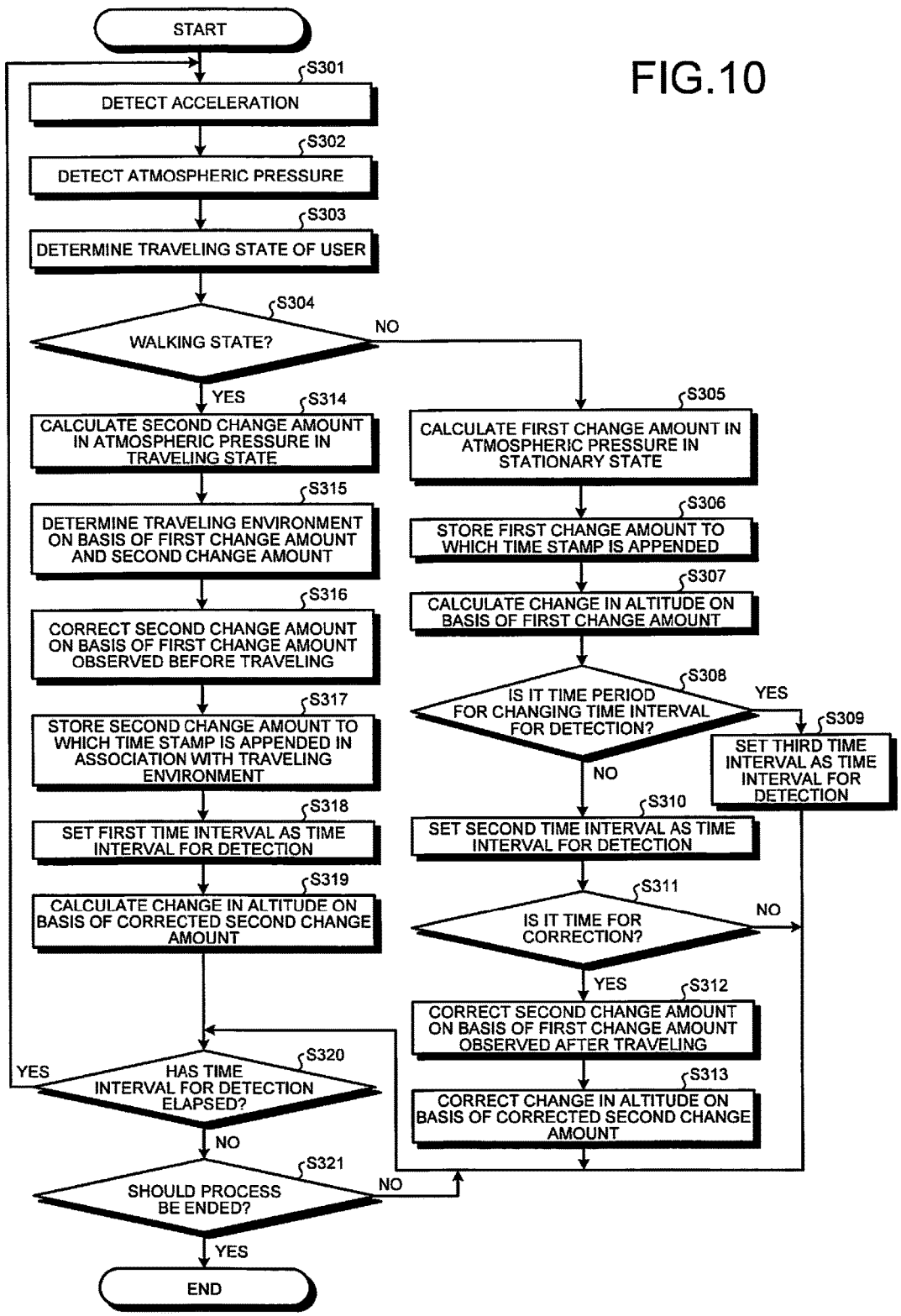
FIG. 10 is a flowchart illustrating a second modification example of the processing procedure in the control by the smartphone.

In the aspect of the embodiments described above, the smartphone 1 may be modified so as to correct the amount of change in the atmospheric pressure in the walking state, on the basis of the change in the atmospheric pressure in the stationary state following the traveling. A second modification example of the processing procedure in the control by the smartphone 1 will be explained, with reference to FIG. 10. FIG. 10 is a flowchart illustrating the second modification example of the processing procedure in the control by the smartphone 1. The processing procedure illustrated in FIG. 10 is realized as a result of the controller 10 executing the control program 9A.

As illustrated in FIG. 10, at Step S301, the controller 10 included in the smartphone 1 causes the acceleration sensor 15 to detect acceleration, appends a time stamp to acceleration information indicating the acceleration value detected by the acceleration sensor 15, and stores the time-stamped information into the acceleration data 9W. At Step S302, the controller 10 causes the atmospheric pressure sensor 19 to detect atmospheric pressure, appends a time stamp to atmospheric pressure information indicating the atmospheric pressure value detected by the atmospheric pressure sensor 19, and stores the time-stamped information into the atmospheric pressure data 9X.

At Step S303, the controller 10 determines a traveling state of the user on the basis of the obtained acceleration information and a determination condition data. When it is determined that the user is not in a walking state, i.e., the user is in a stationary state (No at Step S304), the controller 10 proceeds to Step S305.

At Step S305, the controller 10 calculates a first change amount in the atmospheric pressure in the stationary state, on the basis of the atmospheric pressure data 9X. Further, at Step S306, the controller 10 appends a time stamp to the first change amount and stores the time-stamped first change amount into the storage 9. After that, at Step S307, the controller 10 calculates a change in the altitude on the basis of the first change amount and stores the calculated change in the altitude into the storage 9.

Subsequently, at Step S308, the controller 10 determines whether it is a time period for changing the time interval for the detection. The time period for changing the time interval for the detection denotes a time span determined in order to temporarily raise the sampling rate used for detecting atmospheric pressure values after the user has transitioned from a walking state into a stationary state. When a time which has elapsed since the user transitioned from a walking state into a stationary state is within the time period for changing the time interval for the detection, the controller 10 determines that it is the time period for changing the time interval for the detection. When it is determined that it is time period for changing the time interval for the detection (Yes at Step S308), the controller 10 proceeds to Step S309. At Step S309, the controller 10 sets a third time interval as the time interval for the detection in the acceleration sensor 15 and the atmospheric pressure sensor 19. The third time interval is a time period obtained by temporarily arranging the time period during which the change in the atmospheric pressure is monitored while the user is in a stationary state, to be shorter than the second time interval. Subsequently, the controller 10 proceeds Step S320.

At Step S320, the controller 10 determines whether the time interval for the detection has elapsed. When it is determined that the time interval for the detection has elapsed (Yes at Step S320), the controller 10 returns to Step S301. When the time interval for the detection has not elapsed (No at Step S320), the controller 10 proceeds to Step S321.

At Step S321, the controller 10 determines whether the process should be ended. For example, when having detected an operation to turn off the power of the smartphone 1, the controller 10 determines that the process should be ended. When it is determined that the process should not be ended (No at Step S321), the controller 10 returns to Step S320. When it is determined that the process should be ended (Yes at Step S321), the controller 10 ends the processing procedure illustrated in FIG. 10.

When it is determined that it is not a time period for changing the time interval for the detection (No at Step S308), the controller 10 proceeds to Step S310. At Step S310, the controller 10 sets the second time interval as the time interval for the detection in the acceleration sensor 15 and the atmospheric pressure sensor 19.

Subsequently, at Step S311, the controller 10 determines whether it is time for correction. The time for correction is a time at which a change in the atmospheric pressure in a traveling state of the user is corrected on the basis of a change in the atmospheric pressure detected after the user stops traveling. In the present aspect of the embodiments, the time for correction is set at a time when the user has transitioned from a walking state into a stationary state and the time period for changing the sampling rate has ended. More specifically, the controller 10 determines that it is time for correction when the elapsed time since the user has transitioned into the stationary state overs the time period for changing the time interval for the detection. When it is not time for correction (No at Step S311), the controller 10 proceeds to Step S320, which has already been explained.

When it is time for correction (Yes at Step S311), the controller 10 proceeds to Step S312. At Step S312, the controller 10 corrects the second change amount on the basis of the first change amount observed after the traveling. For example, when the difference between the first change amount before the traveling and the first change amount after the traveling satisfies a predetermined condition, the controller 10 performs the correcting process. Further, examples of the second change amount to be corrected include, but are not limited to, all the second change amounts during the traveling and some second change amounts before the stationary state after travelling by a predetermined number. Examples of the method for correcting the second change amount in the atmospheric pressure include, but are not limited to, a method by which the second change amount is corrected by subtracting the difference between the first change amount before the traveling and the first change amount after the traveling from the second change amount, a method by which the second change amount before correction is corrected on the basis of the first change amount observed after the traveling. After that, at Step S313, the controller 10 corrects the change in the altitude stored in the storage 9, on the basis of the corrected second change amount. Subsequently, the controller 10 proceeds to Step S320, which has already been explained.

When it is determined that the user is in a walking state (Yes at Step S304), the controller 10 proceeds to Step S314. At Step S314, the controller 10 calculates a second change amount in the atmospheric pressure in the traveling state, on the basis of the atmospheric pressure data 9X. After that, at Step S315, the controller 10 determines a traveling environment of the user during the walk, on the basis of the first change amount and the second change amount. After that, Step S316, the controller 10 corrects the second change amount on the basis of the first change amount observed before the traveling.

Subsequently, at Step S317, the controller 10 stores the second change amount to which a time stamp is appended, in association with the traveling environment, into the atmospheric pressure data 9X. After that, at Step S318, the controller 10 sets the first time interval as the time interval for the detection in the acceleration sensor 15 and the atmospheric pressure sensor 19. Further, at Step S319, the controller 10 calculates a change in the altitude on the basis of the corrected second change amount and stores the calculated change in the altitude into the storage 9. Subsequently, the controller 10 proceeds to Step S320, which has already been explained.

As explained above, when having detected that the user transitioned into a stationary state, the smartphone 1 calculates the first change amount in the atmospheric pressure in the stationary state by causing the atmospheric pressure sensor 19 to temporarily detect the atmospheric pressure values with the third time interval, which are shorter than the second time interval. With this arrangement, immediately after the user transitions from the walking state into the stationary state, the smartphone 1 is able to obtain the amount of change in the atmospheric pressure caused by atmospheric changes.

Further, the smartphone 1 corrects the second change amount in the traveling state by also using the first change amount observed after the traveling, in addition to using the first change amount observed before the traveling. With this arrangement, even when the user travels for a long period of time and thereby the first change amount in the atmospheric pressure significantly vary between before the traveling and after the traveling, the smartphone 1 is able to correct the amount of change in the atmospheric pressure in the traveling state.

In the second modification example described above, the example is explained in which, at Step S313, the controller 10 corrects the change in the altitude on the basis of the corrected second change amount; however, the embodiments are not limited to this example. For instance, the controller 10 may be configured so as to re-calculate a change in the altitude on the basis of the corrected second change amount.

Figure 11:
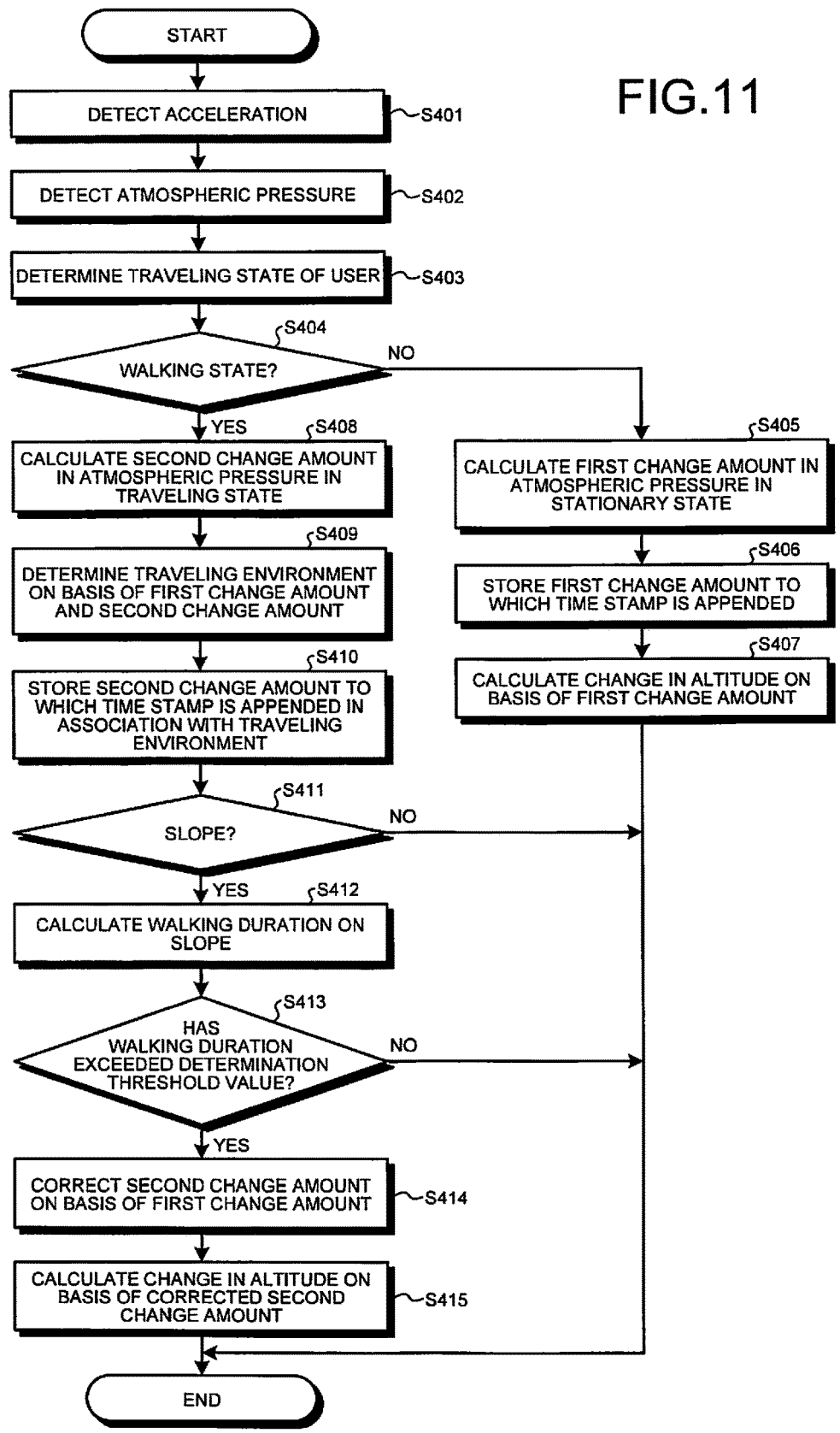
FIG. 11 is a flowchart illustrating a third modification example of the processing procedure in the control by the smartphone.

In the aspect of the embodiments described above, the smartphone 1 may be modified so as to correct the second change amount in the atmospheric pressure on the basis of the change of the atmospheric pressure in a stationary state, when the user continues to walk on a slope. A third modification example of a processing procedure in the control by the smartphone 1 will be explained, with reference to FIG. 11. FIG. 11 is a flowchart illustrating the third modification example of the processing procedure in the control by the smartphone 1. The processing procedure illustrated in FIG. 1 is realized as a result of the controller 10 executing the control program 9A. The processing procedure illustrated in FIG. 11 is repeatedly performed for every predetermined period of time.

As illustrated in FIG. 11, at Step S401, the controller 10 included in the smartphone 1 causes the acceleration sensor 15 to detect acceleration, appends a time stamp to acceleration information indicating the acceleration value detected by the acceleration sensor 15, and stores the time-stamped information into the acceleration data 9W. At Step S402, the controller 10 causes the atmospheric pressure sensor 19 to detect atmospheric pressure, appends a time stamp to atmospheric pressure information indicating the atmospheric pressure value detected by the atmospheric pressure sensor 19, and stores the time-stamped information into the atmospheric pressure data 9X.

At Step S403, the controller 10 determines a traveling state of the user on the basis of the obtained acceleration information and a determination condition data. When it is determined that the user is not in a walking state, i.e., the user is in a stationary state (No at Step S404), the controller 10 proceeds to Step S405. At Step S405, the controller 10 calculates a first change amount in the atmospheric pressure in the stationary state, on the basis of the atmospheric pressure data 9X. After that, at Step S406, the controller 10 appends a time stamp to the first change amount and stores the time-stamped first change amount into the storage 9. Further, at Step S407, the controller 10 calculates a change in the altitude on the basis of the first change amount and stores the calculated change in the altitude into the storage 9. Subsequently, the controller 10 ends the processing procedure illustrated in FIG. 11.

When it is determined that the user is in a walking state (Yes at Step S404), the controller 10 proceeds to Step S408. At Step S408, the controller 10 calculates a second change amount in the atmospheric pressure in the traveling state, on the basis of the atmospheric pressure data 9X. After that, at Step S409, the controller 10 determines a traveling environment of the user during the walk, on the basis of the first change amount and the second change amount. Further, at Step S410, the controller 10 stores a second change amount to which a time stamp is appended into the storage 9 in association with the traveling environment.

Subsequently, at Step S411, the controller 10 determines whether the traveling environment determined at Step S409 is a slope. When it is determined that the traveling environment is not a slope (No at Step S411), the controller 10 ends the processing procedure illustrated in FIG. 11. When it is determined that the traveling environment is a slope (Yes at Step S411), the controller 10 proceeds to Step S412.

At Step S412, the controller 10 calculates the walking duration on a slope, on the basis of the traveling state stored in the state data 9Y. After that, at Step S413, the controller 10 determines whether the duration has exceeded a determination threshold value. The determination threshold value is a time period determined for the purpose of determining whether traveling is continuous. When it is determined that the walking duration has not exceeded the determination threshold value (No at Step S413), the controller 10 ends the processing procedure illustrated in FIG. 11. When it is determined that the walking duration has exceeded the determination threshold value (Yes at Step S413), the controller 10 proceeds to Step S414.

At Step S414, the controller 10 corrects the second change amount on the basis of the first change amount. More specifically, the controller 10 subtracts the amount of change in the atmospheric pressure in the stationary state from the amount of change in the atmospheric pressure in the traveling state, by subtracting the first change amount from the second change amount. After that, at Step S415, the controller 10 calculates a change in the altitude on the basis of the corrected second change amount and stores the calculated change in the altitude into the storage 9. Subsequently, the controller 10 ends the processing procedure illustrated in FIG. 11.

As explained above, when the user has been walking on a slope for a long period of time, the smartphone 1 corrects the amount of change in the atmospheric pressure observed while the user is traveling, on the basis of the amount of change in the atmospheric pressure in the stationary state and further calculates the change in the altitude of the user on the basis of the corrected amount of change in the atmospheric pressure. With this arrangement, when there is a possibility that a change in the atmospheric pressure may be caused by a change in the altitude of the user, the smartphone 1 is able to reduce the effect of the atmospheric change on the change in the atmospheric pressure. As a result, the smartphone 1 is able to reduce the load on the controller 10, by efficiently performing the correcting process only on the data that may exhibit a significant error.

In the aspect of the embodiments described above, the example is explained in which the smartphone 1 causes the acceleration sensor 15 and the atmospheric pressure sensor 19 to perform the detecting process at the same time as each other; however, the embodiments are not limited to this example. For instance, the smartphone 1 may be configured to cause the acceleration sensor 15 and the atmospheric pressure sensor 19 to perform the detecting process at mutually-different times.

In the aspect of the embodiments described above, the example of the smartphone 1 is explained in which the user travels by walking; however, the traveling method of the user is not limited to this example. For instance, the smartphone 1 may be configured so as to correct an amount of change in the atmospheric pressure observed while the user is traveling by running, on the basis of amounts of change in the atmospheric pressure before and after the traveling.

In the aspect of the embodiments described above, for example, the smartphone 1 may be configured so as to determine whether or not the second change amount in the traveling state should be corrected by using the first change amount in the stationary state, on the basis of the weather of the day, of a time zone, or the like. For example, when a weather forecast indicates a sunny day, there is a possibility that the weather may not change. Accordingly, the smartphone 1 may be configured so as to obtain weather forecast data via a communication performed by the communication unit 6, and when no change in the weather is expected on the basis of the obtained weather forecast data, not to correct the second change amount by determining that no change in the atmospheric pressure will occur.

In the aspect of the embodiments described above, the smartphone is explained as an example of a mobile electronic device including an atmospheric pressure sensor; however, the mobile electronic device set forth in the accompanying claims is not limited to a smartphone. The mobile electronic device set forth in the accompanying claims may be a mobile electronic device other than smartphones. Examples of the mobile electronic device include, but are not limited to, a mobile phone, a tablet, a mobile personal computer, a smartwatch, a digital camera, a media player, an electronic book reader, a navigator, and a game machine.

To comprehensively and clearly disclose the technical features set forth in the accompanying claims, characteristics embodiments have thus been explained; however, the accompanying claims are not limited by the embodiments described above and are intended to be carried out in every modification example and substitutable configuration that are conceivable for a person skilled in the art in the relevant technical field within the scope of the fundamental features set forth in the present specification.

The invention claimed is:

1. A mobile electronic device, comprising:
   a housing;
   an atmospheric pressure sensor contained in the housing and configured to detect atmospheric pressure;
   an acceleration sensor contained in the housing and configured to detect acceleration;
   a communicator contained in the housing and configured to receive information; and
   a controller contained in the housing and configured to detect traveling of the mobile electronic device on a basis of the acceleration, wherein
   the controller is configured to calculate a change in an altitude of the mobile electronic device by correcting a change in the atmospheric pressure observed while the mobile electronic device is traveling, on a basis of a change in the atmospheric pressure observed while the mobile electronic device is not traveling,
   the controller is configured to compare a first change amount in the atmospheric pressure detected while the mobile electronic device is not traveling with a second change amount in the atmospheric pressure detected while the mobile electronic device is traveling, and to determine a traveling environment of a subject having the mobile electronic device on a basis of a result of the comparison, and the controller is configured to determine, based on at least the information received by the communicator, whether the controller corrects the second change amount in the atmospheric pressure detected while the mobile electronic device is traveling.

2. The mobile electronic device according to claim 1, wherein the first change amount is at least one of an amount of change in the atmospheric pressure detected while the mobile electronic device is not traveling before the travelling and an amount of change in the atmospheric pressure detected while the mobile electronic device is not traveling after the travelling.

3. The mobile electronic device according to claim 1, wherein the controller is configured to cause the atmospheric pressure sensor to detect atmospheric pressure values at a first time interval when the mobile electronic device is traveling and to cause the atmospheric pressure sensor to detect atmospheric pressure values at a second time interval that is shorter than the first time interval when the mobile electronic device is not traveling.

4. The mobile electronic device according to claim 1, wherein the controller is configured to correct the second change amount in the atmospheric pressure observed while the mobile electronic device is traveling, when a time period during which the mobile electronic device is traveling satisfies a predetermined condition.

5. The mobile electronic device according to claim 1, wherein
the controller is configured to
calculate an energy consumption amount of a user of the mobile electronic device, based on the detected acceleration, and
display the energy consumption amount on a display of the mobile electronic device.

6. The mobile electronic device according to claim 1, wherein
the information received by the communicator relates to weather information, and
in response to the controller determining, based on the received weather information, that no change in weather is expected,
the controller is configured to not correct the second change amount in the atmospheric pressure detected while the mobile electronic device is traveling.

7. A controlling method for controlling a mobile electronic device that includes a housing containing a communicator, an atmospheric pressure sensor and an acceleration sensor, the controlling method comprising steps of:

detecting atmospheric pressure acting on the mobile electronic device by employing the atmospheric pressure sensor;
detecting acceleration acting on the mobile electronic device by employing the acceleration sensor;
detecting traveling of the mobile electronic device on a basis of the acceleration; and
calculating a change in an altitude of the mobile electronic device by correcting a change in the atmospheric pressure observed while the mobile electronic device is traveling, on a basis of a change in the atmospheric pressure observed while the mobile electronic device is not traveling,
the controlling method further comprising:
comparing a first change amount in the atmospheric pressure detected while the mobile electronic device is not traveling with a second change amount in the atmospheric pressure detected while the mobile electronic device is traveling, and determining a traveling environment of a subject having the mobile electronic device on a basis of a result of the comparison; and
determining, based on at least information received by the communicator, whether to correct the second change amount in the atmospheric pressure detected while the mobile electronic device is traveling.

8. A non-transitory storage medium that stores a control program for a computer configured to cause a mobile electronic device that includes a housing containing a communicator, an atmospheric pressure sensor and an acceleration sensor to execute steps of:

detecting atmospheric pressure acting on the mobile electronic device by employing the atmospheric pressure sensor;
detecting acceleration acting on the mobile electronic device by employing the acceleration sensor;
detecting traveling of the mobile electronic device on a basis of the acceleration;
calculating a change in an altitude of the mobile electronic device by correcting a change in the atmospheric pressure observed while the mobile electronic device is traveling, on a basis of a change in the atmospheric pressure observed while the mobile electronic device is not traveling;
comparing a first change amount in the atmospheric pressure detected while the mobile electronic device is not traveling with a second change amount in the atmospheric pressure detected while the mobile electronic device is traveling, and determining a traveling environment of a subject having the mobile electronic device on a basis of a result of the comparison; and
determining, based on at least information received by the communicator, whether to correct the second change amount in the atmospheric pressure detected while the mobile electronic device is traveling.

* * * * *